Aug. 30, 1966 R. L. HEATHCOTE ETAL 3,269,705
APPARATUS FOR ELEVATING TOWER STRUCTURE
Original Filed Aug. 7, 1961 3 Sheets-Sheet 1

INVENTORS
Ralph L. Heathcote
Hans C. Bell

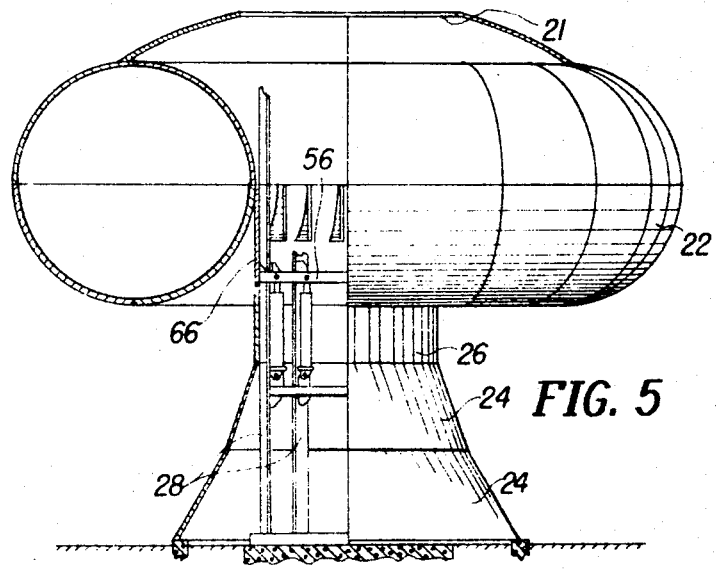
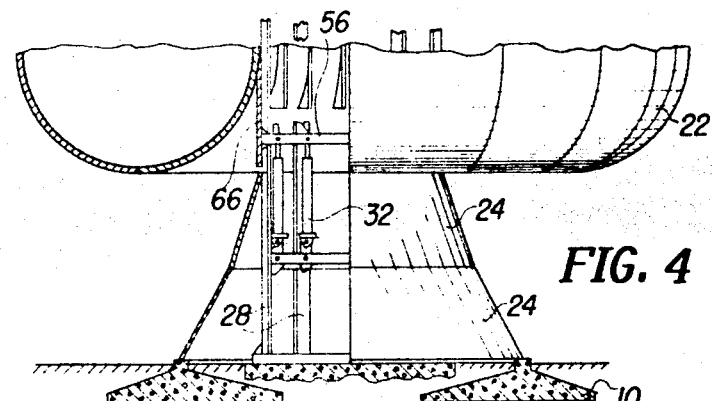
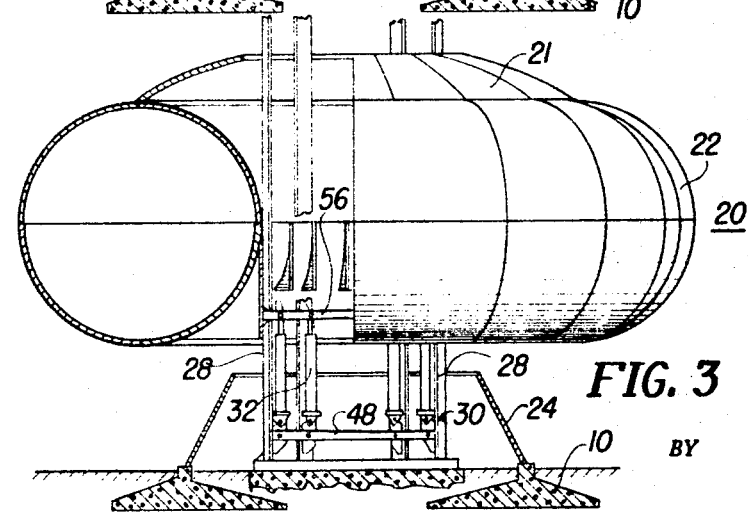
INVENTORS
Ralph L. Heathcote
Hans C. Bell
BY
Attys.

INVENTORS
Ralph L. Heathcote
Hans C. Bell
BY
Attys.

United States Patent Office 3,269,705
Patented August 30, 1966

3,269,705
APPARATUS FOR ELEVATING TOWER STRUCTURE
Ralph L. Heathcote, Lansing, Ill., and Hans C. Bell, Hammond, Ind., assignors to Union Tank Car Company, Chicago, Ill., a corporation of New Jersey
Original application Aug. 7, 1961, Ser. No. 129,581, now Patent No. 3,235,956, dated Feb. 22, 1966. Divided and this application Aug. 9, 1965, Ser. No. 486,252
7 Claims. (Cl. 254—89)

This is a division of application Serial No. 129,581, filed August 7, 1961.

This invention relates in generally to the erection of a tower and in particular to the erection of a tower of the type including a supported tank.

It is the general object of this invention to provide a means for erecting a tower of the type including a supported tank.

It is another object of this invention to provide a means for erecting a tower of the type including a supported tank that is particularly suitable for the erection of flared towers.

It is another object of this invention to provide a means for erecting a tower of the type including a supported tank wherein the tank is assembled at ground level and subsequently lifted upwardly from the ground while at the same time the tower is assembled in sections below the rising tank.

It is another object of this invention to provide a means for erecting a tower of the type including a supported tank wherein the tank is assembled at ground level and initially supported by being tied to a system of supporting columns before being lifted upwardly from the ground and wherein the tower is assembled section by section as the tank rises.

It is another object of this invention to provide a means for erecting a tower of the type including a supported tank wherein the tank is assembled at ground level and initially supported by being tied to a system of supporting columns and wherein a plurality of lifting jacks are positioned around and under the tank and wherein the tank is sequentially lifted upwardly from the ground while the tower is assembled section by section under the tank as the tank rises.

It is another object of this invention to provide a means for erecting a tower of the type including a supported tank wherein the tank is assembled at ground level and initially supported by being tied to a system of supporting columns and wherein a plurality of lifting jacks are positioned around and under the tank and also supported by the system of supporting columns and wherein the tank and plurality of lifting jacks are systematically and alternately untied from the system of supporting columns so as to sequentially lift the tank and wherein the tower is assembly section by section under the tank as the tank rises upwardly.

Briefly, the invention comprises a means for erecting a tower of the type supporting a tank wherein the tank is assembled at ground level and lifted upwardly from the ground and the tower is assembled section by section below the rising tank. A system of supporting columns is provided and the tank is initially tied thereto and therefore supported thereby. A plurality of lifting jacks are then positioned under the tank and the stationary portions thereof are securely tied to the system of supporting columns while the moveable portions thereof are secured to the tank. The tank is then untied from the system of supporting columns and the lifting jacks are extended thereby causing the first lift of the tank. The sections of the tower are then assembled under the lifted tank but are not secured to the tank. Prior to the assembly of the tower, the tank is retied to the system of supporting columns so that the lifting jacks can be positioned for the next lift. The lifting jacks are next untied from the system of supporting columns and the extended portions of the lifting jacks are retracted. The lifting jacks are then repositioned under the tank and the stationary portions of the lifting jacks are retied to the system of supporting columns. The lifting jacks are extended once again thereby causing the second lift of the tank. The next succeeding sections of the tower are then assembled under the lifted tank and the process is repeated step by step with the tank and the lifting jacks being alternately tied to the system of supporting columns. Finally after the last lift, the final sections of the tower are assembled on the tower and connected to the lifted tank. At this time, and only a this time, the tank is also supported on the assembled tower.

The invention both as to its organization and method of operation taken with further objects and advantages thereof will best be understood by reference to the following description taken in connection with the accompanying drawings in which:

FIGURE 3 is a partially cut-away front elevational view of the initial steps in erecting a tower in accordance with the teachings of the invention;

FIGURE 4 is a partially cut-away front elevational view of a further step in erecting a tower in accordance with the teachings of the invention;

FIGURE 5 is a partially cut-away front elevational view of an additional further step in erecting a tower in accordance with the teachings of the invention;

Figure 1:
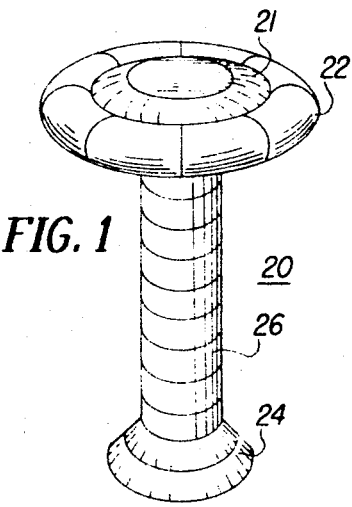
FIGURE 1 is a perspective view of a flared tower which may be erected by practicing the disclosed invention.

Referring now to the drawings, means for erecting a tower of the type including a supporting tank embodying the features of the invention, may be utilized to erect the tower structure 20 illustrated in FIGURE 1. The tower structure 20 is comprised of an upper toroidal tank 22, a substantially cylindrical tower portion 26, and a flared bottom tower portion 24. However, the invention is not limited to towers identical to the tower 20 and tower structures of various configurations can be erected by the use of the invention.

Figure 2:
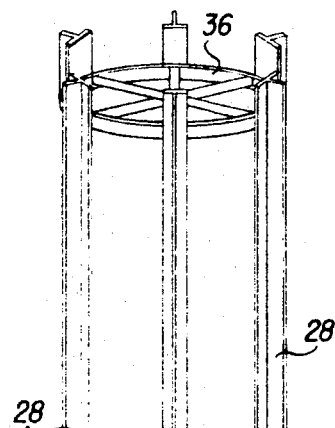
FIGURE 2 is a perspective view of the supporting column system utilized in erecting the tower illustrated in FIGURE 1.

Initially, a foundation 10, upon which the erected tower is to be supported, is constructed. The foundation 10 is also designed to support a system of supporting columns 30, the function of which will be described hereinafter. Subsequent to the construction of the foundation 10, a system of supporting columns 30 comprised of a plurality of supporting columns 28 is erected. This system of supporting columns 30 is best illustrated in FIGURE 2.

The system of supporting columns 30 performs the function of supporting the upper toroidal tank 22 during the construction of the tower 20 and also supports a plurality of lifting jacks 32 which raise the upper toroidal tank 22 to its desired level. After the tower 20 has been completed, the system of supporting columns 30 may be allowed to retain intact and therefore continue to support the upper toroidal tank 22. However, in a case of the erection of a flared tower, such as the tower 20, it may be desirable to remove the system of supporting columns 30 at least in the area of the flaring of the tower 20 as to provide more open space in the flared part of the tower for the construction of needed or desired rooms, compartments, or the like. In such a situation, the upper toroidal tank 22 would be supported by the tower including the substantially cylindrical portion 26 and the flared bottom tower portion 24. The system of supporting columns 30 may be initially erected so as to extend the entire height required as illustrated in FIGURE 2, or may be assembled section on top of section as required, as the upper toroidal tank 22 ascends towards its desired level due to the urging of a plurality of lifting jacks 32.

The system of supporting columns 30 is comprised of a plurality of supporting columns 28, all of which are T shaped and which are assembled with the top of the T facing inwardly of the circle they define. A base support member 34 is provided to interconnect the plurality of supporting columns 28. The base support member 34 is somewhat wheelshaped having provided therein spoked members which intersect at the center of the base support member 34 and which terminate adjacent the top of the T shaped faces of the supporting columns 28. A similar support member 36 is provided at the top of the system of supporting columns 30 and other supporting members interconnecting the plurality of supporting columns 28 may be provided as required.

Subsequent to the construction of the foundation 10, and the assembly of the system of supporting columns 30, the upper toroidal tank 22 is assembled. The upper toroidal tank 22 is assembled at ground level as illustrated in FIGURE 3 and is secured to the system of supporting columns 30 by means (not shown). However, the means could be welding, pinning, bolting or whatever. If the system of supporting columns 30 is initially constructed to its ultimate height, then, openings must be provided in the inner roof 21 of the upper toroidal tank 22 to facilitate the piercing of the roof 21 of the upper toroidal tank 22 by the supporting columns 28.

FIGURE 3 illustrates the tower 20 in its initial formative position and before the first lift or elevation of the upper toroidal tank 22. The foundation 10 has been constructed, the system of supporting columns 30 has been positioned and the upper toroidal tank 22 has been secured to the system of supporting columns 30. Next, a plurality of lifting jacks 32 are positioned under the upper toroidal tank 22 in order to subsequently raise the upper toroidal tank 22.

Figure 8:
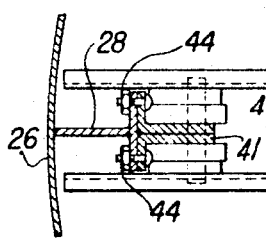
FIGURE 8 is a view taken along the line 8—8 in FIGURE 6.
Figure 6:
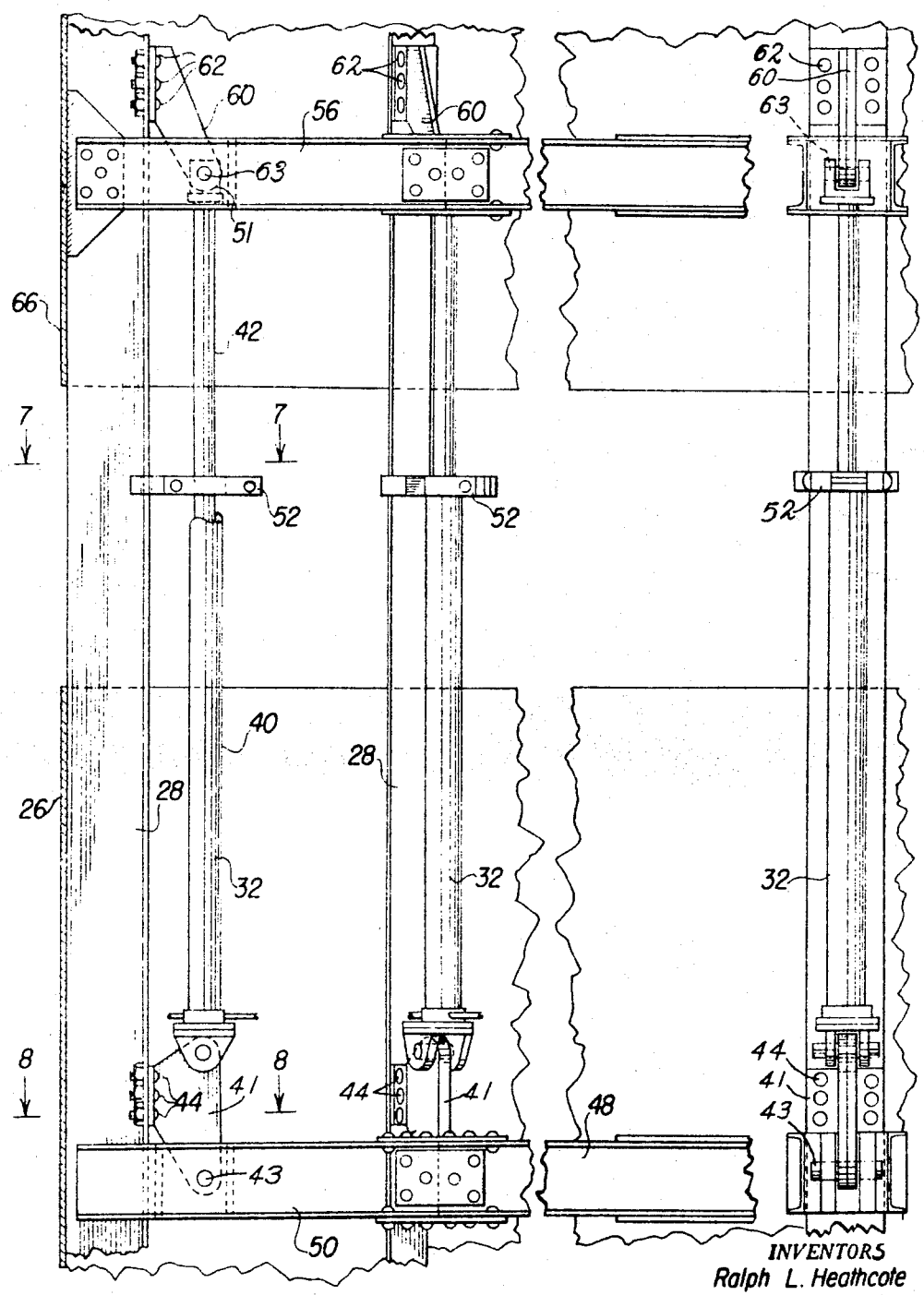
FIGURE 6 is an enlarged partially cut-away cross sectional view illustrating in detail a particular manner of associating the various elements utilized in practicing the teachings of the invention.

The plurality of lifting jacks 32 are comprised essentially of two portions, a stationary portion 40 and a movable portion or rod 42, and this is best illustrated in FIGURE 6. The stationary portion 40 of the lifting jacks 32 is secured through a pivotal member 41 directly to the supporting columns 28, and in the illustrated embodiment of the invention, this is accomplished by a plurality of detachable fasteners 44, for example, bolts and associated nuts, best shown in FIGURES 6 and 8. The plurality of lifting jacks 32 are connected to a spoked stiffening member 48 and permanently secured thereto. Specifically, the pivotal member 41 of each jack 32 is permanently secured to the stiffening member 48 by a pivot pin 43. The spoked stiffening member 48 comprises a plurality of intersecting and integral spokes 50 extending from a central hub (not shown) and terminating just short of the outside of the supporting columns 28 as best illustrated in FIGURE 6. Before and during the lifting of the upper toroidal tank 22, the spoked stiffening member 48 is secured to the supporting columns 28 by any feasible means, such as bolting or the like. The outer ends of the spokes 50 are slotted so as to extend around the inner face of the T shaped supporting columns 28. One of the functions of the spoked stiffening member 48 is to equalize the load between the various lifting jacks 32.

Figure 7:
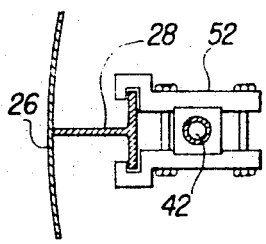
FIGURE 7 is a view taken along the line 7—7 in FIGURE 6.

Positioned at the top of the stationary portion 40 of the lifting jacks 32 are guide elements 52. A guide element 52 is best illustrated in FIGURES 6 and 7. The movable portions or rods 42 of the lifting jacks 32 extend through the guide elements 52, and the guide elements 52 extend around the inner face of the T shaped supporting columns 28 so as to be slidably secured to the supporting columns 28 as best illustrated in FIGURE 7. The guide elements 52 prohibit any pivotable movement by the lifting jacks 32.

The upper ends 52 of the movable portions or rods 42 of the lifting jacks 32 are permanently secured to a stiffening ring 56 by welding or the like at least until the tower has been erected. The stiffening ring 56 is comprised of a plurality of spokes and an integral outer ring portion permanently welded to a provided skirt portion 66 integrally formed in the upper toroidal tank 22 as best seen in FIGURES 3 through 6. Each of these spokes is secured to corresponding upper ends 52 of corresponding lifting jacks 32.

A pivotable arm 60 extends upward from each upper end 52 of each movable portion 42 of the lifting jacks 32 and is therefore permanently secured to the stiffening ring 56 and hence the upper toroidal tank 22. As seen in FIGURE 6, the pivotable arms 60 are detachably fastened to the supporting columns 28 by suitable bolts and associated nuts 62 and, further, are permanently secured to the stiffening ring 56 by pivot pins 63, respectively. The pivotable arms 60 are, of course, not secured to the supporting columns 28 during the lifting of the upper toroidal tank 22 and are bolted to the supporting columns 28 only after the lift has been completed. The plurality of pivotable arms 60 connect or tie the upper toroidal tank 22 to the supporting columns 28 when the upper toroidal tank 22 is not being lifted during construction of the tower 20.

After each lift of the upper toroidal tank 22, and after the upper toroidal tank 22 has been tied to the supporting columns 28 by the bolts and associated nuts 62, the lifting jacks 32 are moved up and retracted at the same time. As previously stated, the movable portions 42 of the lifting jacks 32 are permanently secured to the stiffening ring 56 of the upper toroidal tank 22, and after a lift has occurred and the movable portions 42 have been extended, the stationary portions 40 of the lifting jacks 32 are released or untied from the supporting columns 28 by the removal of the bolts 62 and the spoked stiffening member 48 is disengaged from the supporting columns 28 by removal of the bolts 44. The lifting jacks 32 and the spoked stiffening member 48 are then elevated until the lifting jacks 32 have been totally retracted and in position for a new lift. At this time, the spoked stiffening member 48 and the stationary portions 40 of the lifting jacks 32 are secured or tied to the supporting columns 28 as previously discussed.

Assembly

A tower, such as the tower illustrated in FIGURE 1, may be assembled in accordance with the teachings of the invention by first constructing a foundation 10 to support both the flared bottom tower section 24 and the cylindrical tower sections 26 to eventually help support the upper toroidal tank 22. The foundation 10 is constructed to also support the system of supporting columns 30.

Next, the system of supporting columns 30, best illustrated in FIGURE 2, comprising a plurality of spaced T shaped supporting columns 28 is assembled. The system of supporting columns 30 as previously stated can be assembled at one time, or can be assembled in sections with additional sections being welded to the top of the previous sections as the tower is being erected. If, for example, the system of supporting columns 30 is erected at one time, then openings must be provided in the inner roof 21 of the upper toroidal tank 22 to allow the supporting columns 28 to pass through the inner roof 21 of the upper toroidal tank 22. After the system of supporting columns 30 has been assembled and positioned on the foundation 10, the upper toroidal tank 22 may be assembled and tied to the system of supporting columns 30 in a position such as illustrated in FIGURE 3. The upper toroidal tank 22 may be tied to the system of supporting columns 30 as desired, however, the upper toroidal tank 22 can be tied to the system of supporting columns 30 by means of a plurality of pivotable arms attached to the upper end of the movable portions 42 of the lifting jacks 32 as illustrated in FIGURE 6. This requires, however, that the lifting jacks 32 be positioned before the upper toroidal tank 22 is assembled.

The spoked stiffening member 48 and the plurality of lifting jacks 32 are tied to the system of supporting columns 30 either before the upper toroidal tank 22 is assembled or after the upper toroidal tank 22 is assembled, depending of course on how the upper toroidal tank 22 is tied to the system of supporting columns 30. This is optional. As previously stated, the spoked stiffening member 48 is secured to the supporting columns 28 by any convenient means, and the plurality of lifting jacks 32 are secured to the plurality of supporting columns 28 by means of bolts and associated nuts 44. The guide elements 52 are positioned as previously stated and as illustrated in FIGURE 7 to prevent any movement other than the vertical movement of the movable portions 42 of the lifting jacks 32. The upper ends 51 of the movable portions 42 of the lifting jacks 32 are permanently connected to the stiffening ring 56 via pivot pins 63. In the illustrated embodiment of the invention, the extensions thereof or the pivotable arms 60 of the lifting jacks 32 are detachably secured by means of bolts and associated nuts 62 to the supporting columns 28 to tie the upper toroidal tank to the system of supporting columns 30. The spoked stiffening member 48 and the plurality of lifting jacks 32 are positioned as shown in FIGURE 3, that is, with the lifting jacks 32 not extended and in position ready to perform the first lift of the upper toroidal tank 22. In the position illustrated in FIGURE 3, the upper toroidal tank 22 is supported solely by the system of supporting columns 30, and therefore the flared bottom tower portions 24 may be welded to one another at this time and do not perform any supporting functions.

The first lift is performed by first untying the upper toroidal tank 22 from the system of supporting columns 30 and supporting the upper toroidal tank 22 on the plurality of lifting jacks 32. The lifting jacks 32 are energized by means (not shown) and not forming a part of this invention, and the movable portions or rods 42 of the lifting jacks 32 are extended, thereby pushing the upper toroidal tank 22 upwardly. After the movable portions 42 of the lifting jacks 32 have been completely extended, the first lift is complete.

The pivotable arms 60 of the lifting jacks 32 are then bolted to the supporting columns 28 to thereby secure the upper toroidal tank 22 to the system of supporting columns 30. At this time, all the supporting of the upper toroidal tank 22 is again done by the system of supporting columns 30, and therefore the lifting jacks 32 can be released from the system of supporting columns 30 and repositioned for the second lift. The repositioning for the second lift is illustrated in FIGURE 4, and after the first lift has been accomplished, the second flared bottom tower section 24 may be welded to the first flared bottom tower section 24 as illustrated in FIGURE 4. The lifting jacks 32 and the spoked stiffening member 48 attached to lifting jacks 32 are positioned for the second lift by first disconnecting the spoked stiffening member 48 and the stationary portions 40 of the lifting jacks 32 from the system of supporting columns 30, and this is done by removing the bolts 44. Therefore, at this time, the lifting jacks 32 and the spoked stiffening member 48 are disconnected from the system of supporting columns 30. The spoked stiffening member 48 and the lifting jacks 32 are then lifted upwardly by means (not shown) and which do not form a part of this invention. As the spoked stiffening member 48 and the lifting jacks 32 are moved upwardly, the extended movable portions 42 of the lifting jacks 32 telescope within the stationary portions 40 of the lifting jacks 32. The lifting jacks 32 are completely retracted when the guide elements 52 of the lifting jacks 32 are in near proximity with the stiffening ring 56 of the upper toroidal tank 22. The guide elements 52 need not be detached from the supporting columns 28 inasmuch as their construction enables the guide elements to slide up the faces of the T shaped supporting columns 28 as can be seen in FIGURE 7.

After the spoked stiffening member 48 and the lifting jacks 32 have been positioned for the second lift as illustrated in FIGURE 5, the stationary portions 40 of the lifting jacks 32 via the pivotal members 41 are secured to the supporting columns 28 by the bolts and associated nuts 44. The upper toroidal tank 22 is then untied from the supporting columns 28 by removing the bolts 62 associated with the pivotable members 60. The upper toroidal tank 22 is now supported only by the plurality of lifting jacks 32 and can therefore be lifted upwardly by activation of the lifting jacks 32. The lifting jacks 32 are again activated and the movable portions or rods 42 of the lifting jacks 32 are therefore extended thus pushing the upper torodial tank 22 up one more step. After the second lift, one section of the substantially cylindrical tower section 26 of the tower 20 may be assembled and welded to the flared bottom tower sections 24 previously assembled.

Further lifts occur in the same manner and additional tower sections 26 are assembled as the upper toroidal tank 22 moves upwardly. The upper toroidal tank 22 is supported by the system of supporting columns 30 until the last lift has been accomplished and not until the final lift of the upper toroidal tank 22 is the upper toroidal tank 22 ever supported by the tower sections 24 and 26, respectively. After the upper toroidal tank 22 is elevated to its final position, the upper toroidal tank 22 is permanently secured to the system of supporting columns 30 by any means, such as welding, riveting or the like. Also, the uppermost substantially cylindrical tower section 26 of the tower 20 is welded to the skirt portion 66 of the upper toroidal tank 22, and at this time, and only at this time, is the upper toroidal tank 22 also supported by the tower sections 26 and 24 of the tower 20. If desired, both the system of supporting columns 30 and the tower sections 26 and 24 can both share in the support of the upper toroidal tank 22. However, it is permissible to remove the portion of the system of supporting columns 30 within the tower 20 defined by the flared sections 24, if greater free space area is desired. Then, the upper toroidal tank 22 would be supported by the tower 20 alone and the supporting columns 28 will act as braces and stiffeners.

While an embodiment described herein is at present considered to be preferred, it is understood that various modifications and improvements may be made therein, and it is intended to cover in the appended claims all such modifications and improvements as fall within the true spirit and scope of the invention.

What is desired to be claimed and secured by Letters Patent of the United States is:

1. An apparatus for erecting a tower of the type including a supported structure, comprising: a system of supporting columns adapted to disengageably support the structure, a plurality of lifting jacks including relatively movable first and second members, said first members having means for securing to said structure and having means for disengageable connection to said system of supporting columns, said second members having mounting means for disengageable connection to said system of supporting columns, whereby vertical extension of said first members relative to said second members with said securing means connector means disengaged from said system of supporting columns and said mounting means connected said system is effective to raise said structure relative said system, while subsequent engagement of said connector means with said system and then retraction of said second members relative to said first members with said mounting means disengaged from said system is effective to reposition said lifting jacks for lifting said structure further while holding said structure in its initially raised position.

2. The apparatus of claim 1 further characterized in that said first and second members of said lifting jacks telescope relative to each other and extend downwardly from said connector means.

3. The apparatus of claim 1 further characterized in that said mounting means includes a radially extending stiffening structure having a plurality of spokes engageable and disengageable with the columns of said system.

4. The apparatus of claim 1 further characterized by and including guide means mounted on each of said second members and slidably engaging corresponding columns.

5. An apparatus for erecting a tower of the type including a supported structure, comprising: a plurality of vertically disposed columns arranged in a circle, a lifting jack adjacent each of said columns and including telescoping first and second members, said first members having means for securing to said structure and having connector means for disengageable connection to said system of supporting columns, said second members each having mounting means for disengageable connection to a corresponding column, whereby vertical extension of said first members relative to said second members with said connected to said structure and said connector means disengaged from corresponding columns and said mounting means connected to said system is effective to raise said structure relative to said columns, while subsequent engagement of said connector means with said columns and then retraction of said second members relative to said first members with said mounting means disengaged from corresponding columns is effective to reposition said lifting jacks for lifting said structure further while holding said structure in its initially raised position.

6. The apparatus of claim 5 further characterized in that each of said columns is substantially T-shaped in cross section, said mounting means further including a radially extending stiffening structure having a plurality of spokes slidable on and engageable and disengageable with the cross members of said T-shaped columns.

7. The apparatus of claim 6 further characterized by and including guide means mounted on each of said members and slidably engaging corresponding cross members.

References Cited by the Examiner

FOREIGN PATENTS

| 233,606 | 4/1961 | Australia. |
| 783,915 | 10/1957 | Great Britain. |
| 842,272 | 7/1960 | Great Britain. |

WILLIAM FELDMAN, *Primary Examiner.*

OTHELL M. SIMPSON, *Examiner.*